(12) United States Patent  
Muramatsu

(10) Patent No.: US 6,393,355 B1
(45) Date of Patent: May 21, 2002

(54) GAS TURBINE AEROENGINE CONTROL SYSTEM

(75) Inventor: Hironori Muramatsu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,218

(22) Filed: Aug. 10, 2000

(30) Foreign Application Priority Data

Oct. 5, 1999 (JP) .......................................... 11-284473

(51) Int. Cl.[7] .......................... G06F 19/00; G06G 7/70
(52) U.S. Cl. ...................... 701/100; 701/99; 60/39.03
(58) Field of Search ................. 701/99, 100; 60/39.03, 60/39.091, 39.281, 39.282, 39.141

(56) References Cited

U.S. PATENT DOCUMENTS

| | | | | |
|---|---|---|---|---|
| 4,006,590 A | * | 2/1977 | Itoh | ........................ 60/39.281 |
| 4,077,204 A | * | 3/1978 | Itoh | ........................ 60/39.281 |
| 4,122,667 A | * | 10/1978 | Hosaka et al. | ........... 60/39.091 |
| 4,249,238 A | | 2/1981 | Spang, III et al. | ......... 60/39.24 |
| 4,545,198 A | * | 10/1985 | Yoshida | ...................... 60/39.25 |
| 5,394,689 A | | 3/1995 | D'Onofrio | ................... 60/204 |
| 5,775,089 A | * | 7/1998 | Skarvan | ..................... 60/39.03 |

FOREIGN PATENT DOCUMENTS

| | | |
|---|---|---|
| EP | 0005426 A1 | 11/1979 |
| EP | 0273849 A2 | 7/1988 |

* cited by examiner

*Primary Examiner*—Jacques H. Louis-Jacques
(74) *Attorney, Agent, or Firm*—Arent Fox Kintner Plotkin & Kahn, PLLC

(57) ABSTRACT

In a control system for a gas turbine aero engine, without using the engine inlet sensors, the engine inlet condition data including the intake air temperature and the intake air pressure is estimated based at least on the detected rotational speed of the turbine, the detected inlet pressure of the turbine and the detected atmospheric pressure, etc. through reasoning. Thus, the system can remove the engine inlet sensors (which are generally expensive) and instead, enables to estimate the engine inlet condition data necessary for controlling the engine with a relatively simple configuration.

11 Claims, 6 Drawing Sheets

GAS TURBINE AEROENGINE CONTROL SYSTEM

BACKGROUND OF THE INVENTION

1. Field of the Invention

This invention relates to a control system for a gas turbine aeroengine.

2. Description of the Related Art

In a control system for an aircraft engine, the data on the engine inlet conditions including Mach number, pressure altitude and outside air temperature are generally detected from outputs of engine inlet sensors such as a temperature sensor and a pressure sensor, all installed at the inlet (air intake) of the engine. When an aircraft has an on-board computer installed in the airframe, the airframe on-board computer determines the engine inlet condition data and sends the same to a computer of an engine control system installed at the engine. Even if the engine computer is merely provided with the data from the airframe computer, the engine computer still needs the inlet sensors as a backup for a case when the engine computer is not able to receive the data from the airframe computer due to, for example, a communication trouble therebetween.

For that reason, an ordinary prior art control system is provided with a temperature sensor and a pressure sensor installed near an air intake (engine inlet) at the front of an engine (turbofan engine) for detecting the intake air temperature (herinafter referred to as "T1") and the intake air pressure (hereinafter referred to as "P1") at that location.

Since, however, these engine inlet sensors such as the temperature sensor and the pressure sensor are located near the intake (engine inlet), the sensors are liable to suffer from the problem of FOD (Foreign Object Damage) and/or icing. Therefore, the engine inlet sensors require a sufficient strength to prevent them from being damaged by foreign objects such as birds and hail. Moreover, the sensors need a temperature raising means such as a heater to avoid being iced over. Accordingly, the engine inlet sensors are generally expensive.

Therefore, it is preferable to remove the engine inlet sensors and to estimate the engine inlet condition data based on outputs from the other sensors.

As regards the parameter estimation, U.S. Pat. No. 4,249, 238 proposes a gas turbine engine control system which maintains a selected level of engine performance despite the failure or abnormal operation of one or more engine parameter sensors.

However, this prior art does not disclose removing any sensor such that the necessary data is estimated from an output(s) of other remaining sensors. Moreover, the parameter estimation proposed by this prior art requires an engine model which should be updated on a real-time basis. This disadvantageously makes the configuration of the system complicated.

SUMMARY OF THE INVENTION

An object of this invention is therefore to overcome the problems of the prior art by providing a control system for a gas turbine aeroengine that, without using the engine inlet sensors and instead, enables it to estimate necessary engine inlet condition data based on outputs from other sensors through reasoning or logic with a relatively simple configuration.

For realizing this object, the present invention provides a system for controlling a gas turbine aeroengine having at least a turbine which is rotated by gas produced by the engine to rotate a rotor that sucks in air, comprising: turbine rotational speed detecting means for detecting a rotational speed of the turbine; turbine inlet pressure detecting means for detecting an inlet pressure of the turbine; atmospheric pressure detecting means for detecting an atmospheric pressure exerting on the engine; and engine inlet condition data estimating means for estimating engine inlet condition data based at least on the detected rotational speed of the turbine, the detected inlet pressure of the turbine and the detected atmospheric pressure.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A control system for a gas turbine aeroengine according to a first embodiment of this invention will now be explained with reference to the drawings.

Figure 1:
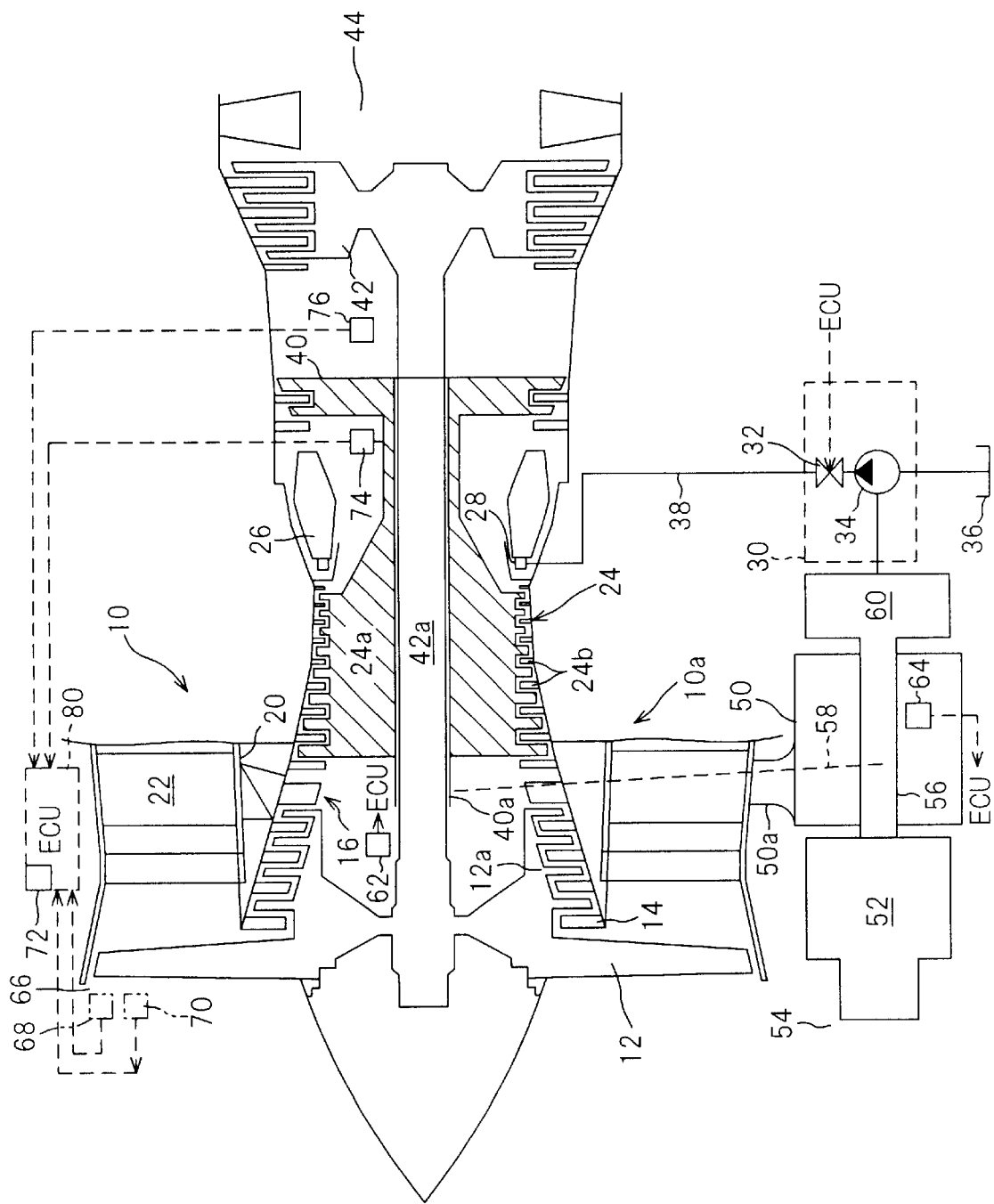
FIG. 1 is an overall schematic view of a control system for a gas turbine aeroengine according to a first embodiment of this invention.

FIG. 1 is a schematic diagram showing the overall system.

The four types of gas turbine engines ordinarily used in aircraft are the turbojet engine, turbofan engine, turboprop engine and turboshaft engine. A two-spool (shaft turbofan) engine will be taken as an example in the following explanation.

In FIG. 1, reference symbol 10 designates a turbofan engine and 10a its main engine unit. The engine 10 is mounted at an appropriate location on an airframe (not shown).

The engine 10 is equipped with a fan (rotor blades) 12 that sucks in air while rotating rapidly. A rotor 12a is formed integrally with the fan 12. The rotor 12a and a stator 14 facing it, together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan is balanced by a force of reaction that acts on the aircraft as a propulsive force or thrust. Much of the propulsion is produced by the air flow from the fan. The air compressed by the low-pressure compressor 16 flows rearward to a high-pressure compressor 24 where it is further compressed by a rotor 24a and a stator 24b and then flows to a combustion chamber 26.

The combustion chamber 26 is equipped with fuel nozzles 28 that pressurized fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion flows to a high-pressure turbine 40 and rotates the high-pressure turbine 40 at high speed. The high-pressure turbine 40 is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which it rotates at a relatively low speed. The low-pressure turbine 42 is connected to the rotor 12a of the low-pressure compressor 16 through a low-pressure turbine shaft 42a. The rotor 12a is therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and an unshown gear mechanism including a bevel gear etc.) so as to pull in air needed for combustion.

The rotation of the shaft 56 is also transmitted to a PMA (Permanent Magnet Alternator) 60 and the fuel pump 34. The fuel pump 34 is therefore driven to spray fuel from the fuel nozzles 28 as explained above. The resulting air-fuel mixture is ignited to start combustion.

When the engine 10 reaches a self-sustaining speed, the rotation of the high-pressure turbine shaft 40a is transmitted back through the drive shaft 58 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the rotational speed of the low-pressure turbine (speed of the low-pressure turbine shaft 42a). An N2 sensor (speed sensor) 64 installed near the shaft 56 outputs a signal proportional to the rotational speed of the high-pressure turbine (speed of the high-pressure turbine shaft 40a).

A P0 sensor (pressure sensor) 72 installed inside an ECU (Electronic Control Unit), explained below, outputs a signal proportional to atmospheric pressure P0 exerting on the engine 10. A P3 sensor (pressure sensor) 74 installed downstream of the rotor 24a outputs a signal proportional to the output pressure (inlet pressure to the turbines) P3 of the high-pressure compressor 24.

An ITT sensor (temperature sensor) 76 installed at an appropriate location between the high-pressure turbine 40 and the low-pressure turbine 42 outputs a signal proportional to the temperature (representative engine temperature) ITT at that location.

Thus, as mentioned above, this embodiment has neither the temperature sensor 68 nor the pressure sensor 70 to be installed near the air intake (engine inlet) 66 at the front of the engine for detecting the intake air temperature T1 and the intake air pressure P1 at that location. These sensors are removed from the configuration of the system.

Returning to the explanation of FIG. 1, the aforementioned ECU (designated by reference numeral 80) is incorporated at an upper end position of the main engine unit 10a. The outputs of the sensors mentioned above are sent to the ECU 80.

Figure 2:
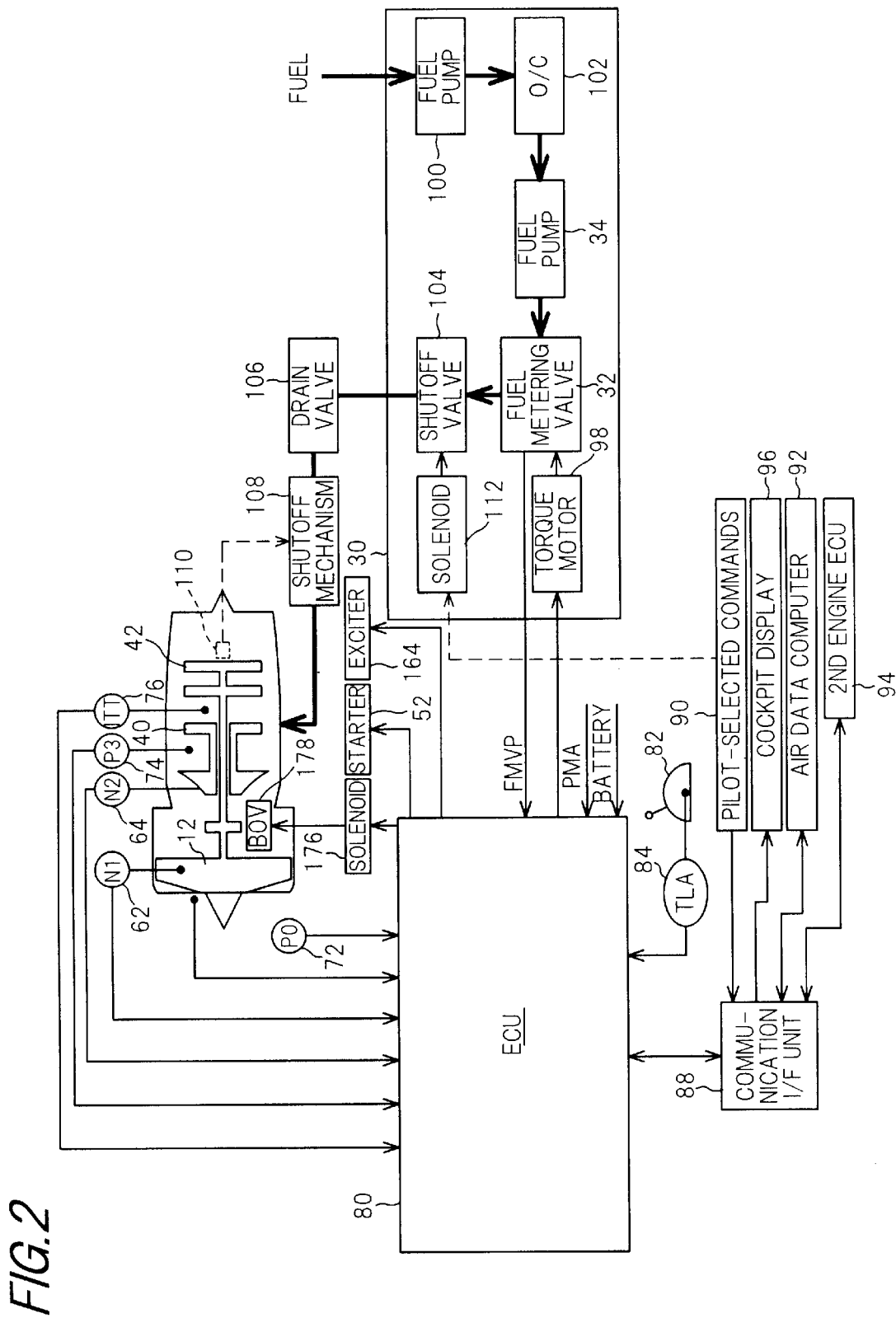
FIG. 2 is a block diagram showing the configuration of an ECU and an FCU in the system illustrated in FIG. 1.

The ECU 80 and the FCU 30 are illustrated in the block diagram of FIG. 2, with the overall configuration of the FCU 30 being shown in detail.

Figure 3:
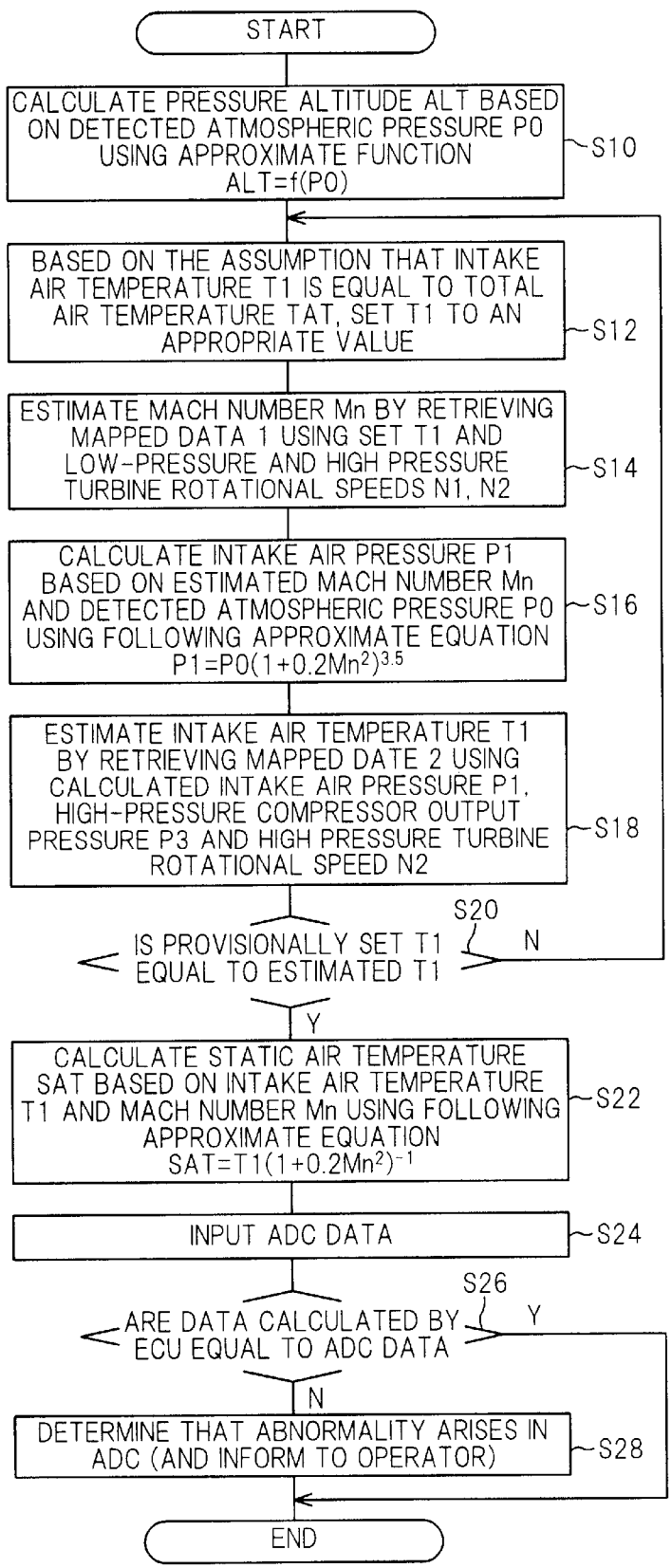
FIG. 3 is a flow chart showing the operation of the system illustrated in FIG. 1.
Figure 5:
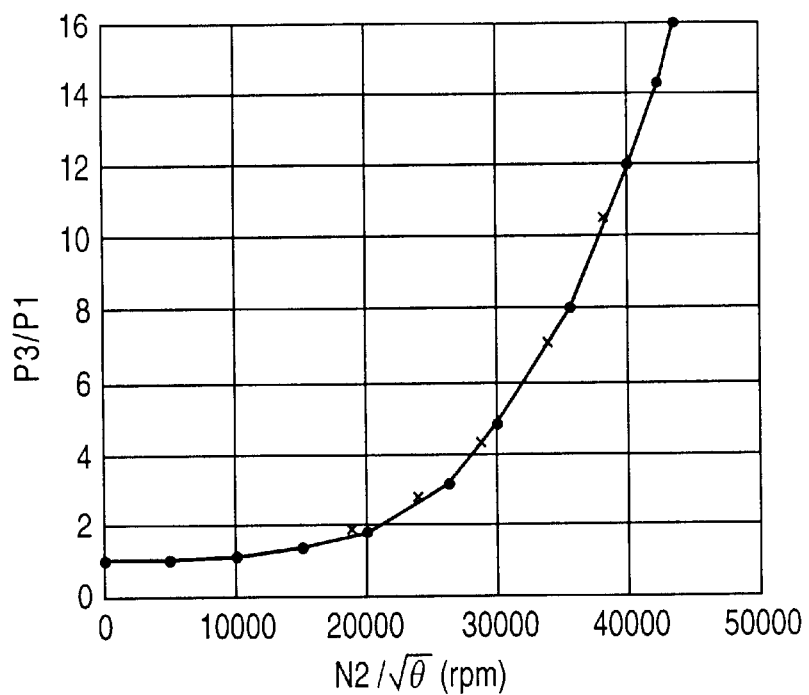
FIG. 5 is a graph showing the characteristics of mapped data 2 referred to in the flow chart of FIG. 3.

In addition to the group of sensors set out above, a TLA (throttle lever position) sensor 84 installed near a throttle lever (thrust lever) 82 provided near the pilot (operator)'s seat (cockpit; not shown) outputs a signal proportional to the throttle lever position TLA specified by the pilot (corresponding to a desired power output specified by the operator (pilot)). The output of the TLA sensor 84 is also forwarded to the ECU 80. In FIGS. 2, 3 and 5, the sensors (P0 sensor, TLA sensor etc.) are indicated by the symbols for the parameters they detect (P0, TLA etc).

An FMVP sensor (fuel metering valve position sensor; not shown in FIG. 2) installed at an appropriate location in the FCU 30 outputs a signal proportional to the valve position FMVP of the fuel metering valve 32. The output of the FMVP sensor is also forwarded to the ECU 80.

The ECU 80 is also connected with a communication interface unit 88 through which it receives (or sends) pilot-selected commands 90 from devices other than the throttle lever 82, data from an on-board computer (Air Data Computer or ADC) 92 installed in the airframe (not shown), and data from an ECU 94 installed at a second engine (not shown). The data in the ECU 80 is sent through the communication interface unit 88 to be displayed on a display 96 located in the cockpit.

Based on the input data, the ECU 80 calculates a command value (control input or manipulated variable) for supplying fuel to the engine 10 at the flow rate needed to bring low-pressure turbine shaft speed (low-pressure turbine speed) N1 to the speed corresponding to the throttle lever position (pilot desired output) TLA. The command value is calculated as a command value indicating the amount of current to be supplied to a torque motor 98. The command value is sent to the FCU 30.

The ECU 80 further monitors whether or not the detected values of the low-pressure turbine speed N1 and the high-pressure turbine speed N2 exceed predetermined values (e.g., values equivalent to 107% of the respective maximum speeds). When either of the detected low-pressure turbine speed N1 and high-pressure turbine speed N2 exceeds the predetermined value, the ECU 80 makes an overspeed determination and then determines a current command value to be supplied to a torque motor 98 and sends the same to the FCU 30 for bringing the fuel flow rate to the engine 10 to a prescribed value, specifically to zero or a minimum value.

The FCU 30 is equipped with a low-pressure fuel pump 100 that pumps fuel from the fuel tank 36 (not shown in FIG. 2) and supplies it to the fuel pump 34 through a filter (and oil cooler) 102. The fuel pump 34 raises the fuel to a high pressure and supplies it to the fuel metering valve 32. The fuel metering valve 32 is connected with a torque motor 98 that determines its spool position. The flow rate of the fuel pressurized by the fuel pump 34 is therefore adjusted (metered) by the fuel metering valve 32 in response to the spool position thereof.

The metered fuel is supplied to the fuel nozzles 28 (not shown in FIG. 2) through a shutoff valve 104, a drain valve 106 and a shutoff mechanism 108.

An emergency stop switch 110 is connected to the low-pressure turbine shaft 42a (not shown in FIG. 2). If the low-pressure turbine shaft 42a should be displaced for some reason, the emergency stop switch 110 will turn on to operate the shutoff mechanism 108 and mechanically block the supply of fuel to the fuel nozzles 28. In addition, a solenoid 112 is provided in association with the shutoff valve 104. The solenoid 112 is responsive to the pilot-selected command(s) 90 for operating the shutoff valve 104 to block the supply of fuel to the fuel nozzles 28.

As will be explained, the CPU 80a of the ECU 80 estimates the engine inlet condition data necessary for controlling the engine 10 including the Mach number (hereinafter referred to as "Mn"), the pressure altitude (hereinafter referred to as "ALT"), outside air temperature (more precisely the total air temperature hereinafter referred to as "TAT") and the static air temperature (hereinafter referred to as "SAT") based on the outputs of the sensors mentioned above through reasoning or logic.

FIG. 3 is a flow chart showing the operation of the control system for a gas turbine aero engine according to the embodiment of this invention, more particularly, the estimation of the engine inlet condition data.

Explaining the flow chart, the program begins in S10 in which the pressure altitude ALT is calculated based on the detected atmospheric pressure P0 using an approximate function mentioned there. The pressure altitude ALT is thus determined not as the distance from the ground, but as a value relating to the atmospheric pressure. Although the detected atmospheric pressure P0 is immediately used in this embodiment, it is alternatively possible to correct the same by temperature or some similar parameters and to use the corrected value.

The program then proceeds to S12 in which, based on the assumption that the intake air temperature T1 is almost equal to total air temperature TAT, the intake air temperature T1 is provisionally set to an appropriate value. Since the temperature sensor for detecting the intake air temperature T1 (and the pressure sensor for detecting the intake air pressure P1) is removed, the intake air temperature T1 is not actually measured in this embodiment. However, since the temperatures T1 and TAT are generally almost equal to each other, the temperature T1 is provisionally determined to be an appropriate value.

Here, explaining the outside air temperature, in case of an aircraft which flies at a high speed such as that disclosed in the embodiment, air colliding against a sensing element of the outside air temperature sensor is adiabatically compressed and this raises the temperature. For that reason, the sensor indicates the temperature which is higher than the actual atmospheric temperature. This measured temperature is called the total air temperature TAT, while the actual atmospheric temperature is called the static air temperature SAT.

The static air temperature SAT can be determined as follows.

$$SAT=(TAT/(1+0.2\ KMn^2)$$

In the above, K: constant, Mn: Mach number. Thus, the Mach number should first be calculated and based thereon, than the static air temperature (true outside air temperature) SAT should be calculated.

Returning to the explanation of the flow chart, the program proceeds to S14 in which the Mach number Mn is estimated by retrieving mapped data 1 using the provisionally-set intake air temperature T1, the detected rotational speed of the low-pressure turbine N1 and the detected rotational speed of the high-pressure turbine N2 as address data.

Figure 4:
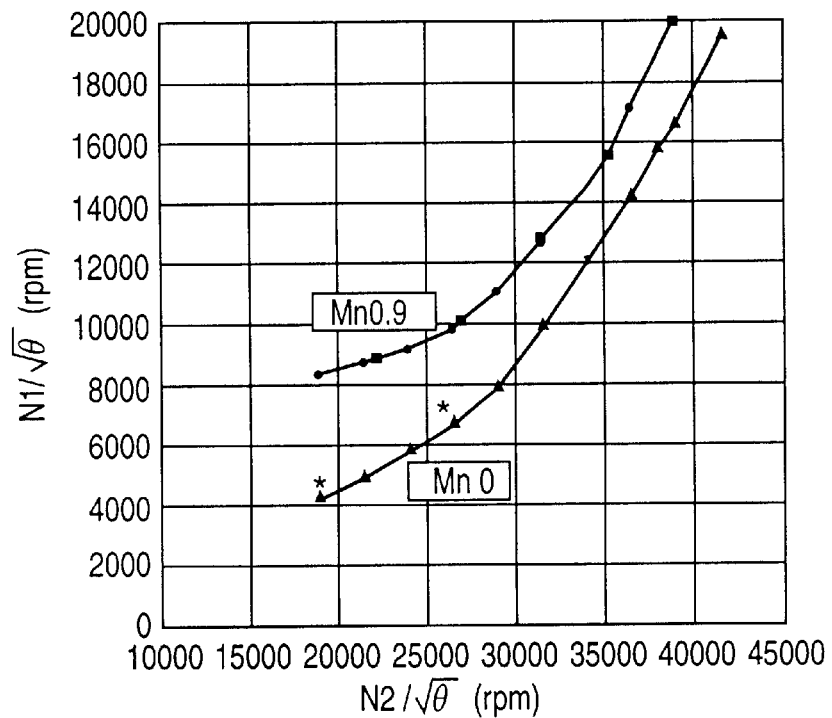
FIG. 4 is a graph showing the characteristics of mapped data 1 referred to in the flow chart of FIG. 3.

FIG. 4 is a graph showing the characteristics of mapped data 1. The illustrated characteristics should be predetermined through experimentation. In the figure, $\theta$ indicates the atmospheric pressure ratio and is calculated as follows.

$$\theta=T1/TSTD$$

In the above, T1: intake air temperature; TSTD: predetermined temperature (e.g. 288.15[° K]). T1 and TSTD are indicated by [° K].

It should be here noted that, although the characteristics corresponding to the minimum Mach number (Mn=0) and the maximum Mach number (Mn=0.9) are illustrated in the figure, similar characteristics are predetermined (or determined through interpolation) between the values.

The Mach number Mn is determined as follows.

$$Mn=\omega/\sqrt{\kappa RT}$$

In the above, $\omega$: average velocity of flow; $\kappa$: specific-heat ratio; R: gas constant; and T: temperature of ideal gas.

Again returning to the explanation of the flow chart, the program proceeds to S16 in which the intake air pressure P1 is calculated based on the estimated Mach number Mn and the detected atmospheric pressure P0 using an approximate equation or function illustrated there.

The program then proceeds to S18 in which the intake air temperature T1 is again estimated by retrieving mapped data 2 using the calculated intake air pressure P1, the detected high-pressure compressor output pressure (inlet pressure to the turbines) P3 and the detected rotational speed of the high-pressure turbine N2 as address data. FIG. 5 is a graph showing the characteristics of mapped data 2. The illustrated characteristics should similarly be predetermined through experimentation.

The program then proceeds to S20 in which it is determined whether the intake air temperature T1 (provisionally set in S12) is equal to the intake air temperature T1 (calculated in S18) coincide, more precisely that the provisionally set T1 is completely equal to or at least substantially equal to the estimated T1. When the result is negative, the program loops back to S12 to repeat the foregoing procedures until a newly set value converges to the calculated value.

On the other hand, when the result is affirmative, the program proceeds to S22 in which the static atmospheric pressure SAT is calculated based on the determined intake air temperature T1 and the Mach number Mn using an approximate equation shown there.

The program then proceeds to S24 in which the engine inlet condition data determined by the ADC (the airframe on-board computer) 92 is input from the ADC 92 through the communication interface unit 88.

The program then proceeds to S26 in which it is determined whether the engine inlet condition data determined by the ECU 80 is (completely or at least substantially) equal to that determined by the ADC 92.

When the result is negative, the program proceeds to S28 in which it is determined that an abnormality arises in the system of ADC 92 or its communication system, and if desired, the result is informed to the operator (pilot) by, for example, using the display 96 located in the cockpit. When the result is affirmative, since this indicates the system of ADC 92 including its communication system operates normally, the program is terminated.

Having been configured in the foregoing manner, the control system for a gas turbine aeroengine according to this embodiment makes it possible to determine the necessary engine inlet condition data, without using the engine inlet sensors including the temperature sensor 68 and the pressure sensor 70, based on the outputs from the sensors (other than the engine inlet sensors) through reasoning or logic.

Further, different from those disclosed in U.S. Pat. No. 4,249,238, since no engine model or real-time basis model updating is needed, the control system according to this embodiment is relatively simple in configuration (more precisely in the configuration of reasoning or logic).

Furthermore, the control system according to this embodiment can detect an abnormality arising in the system of ADC 92 or its communication system and can inform the result to the operator (pilot).

It should be noted in the above that the procedures mentioned in S24 and on are not indispensable for achieving the aforesaid object. In other words, it suffices if the engine inlet condition data is determined by reasoning or logic. It is not always necessary to detect the failure of the system of ADC 92 in achieving the aforesaid object.

Figure 6:
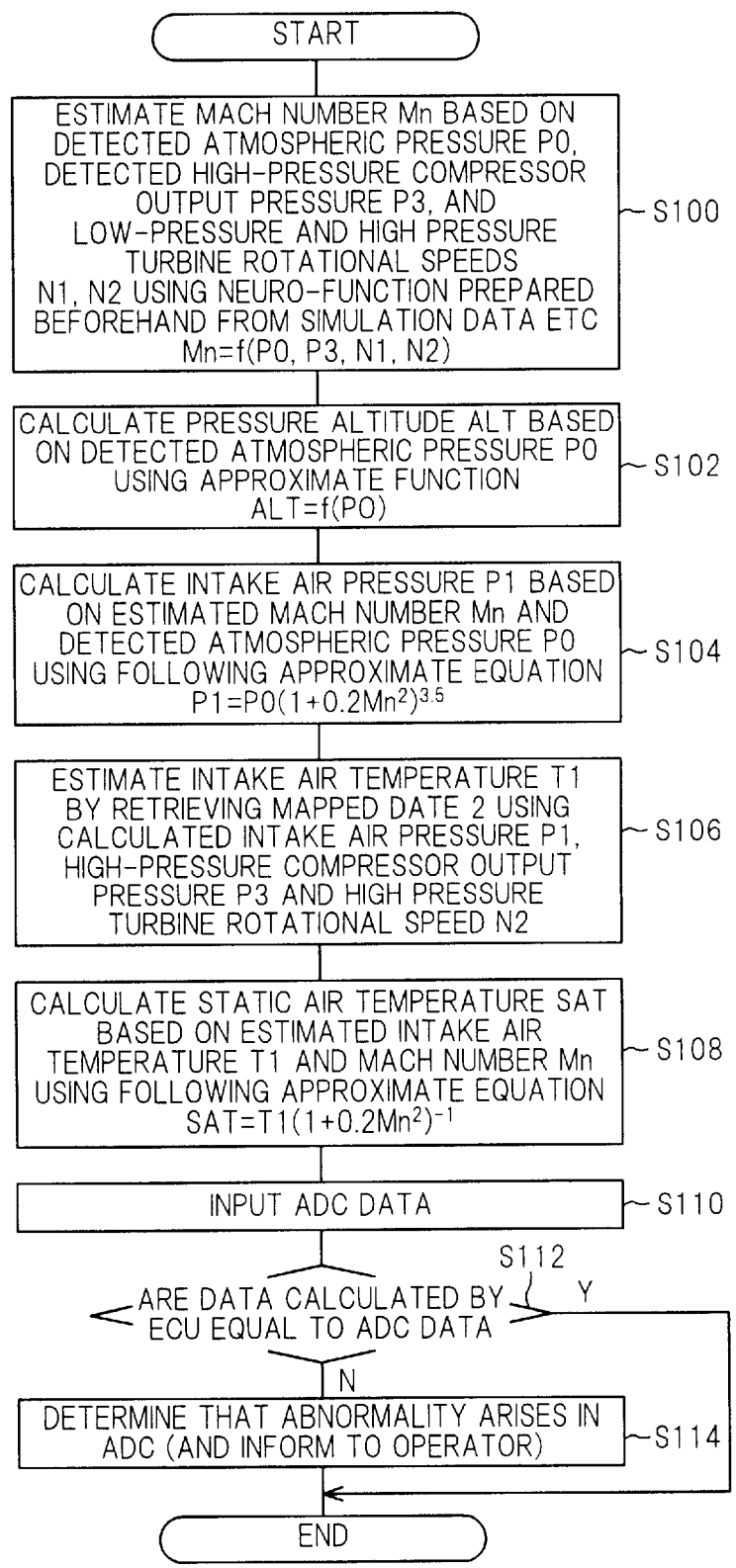
FIG. 6 is a flow chart, similar to FIG. 3, but showing the operation of a control system for a gas turbine aeroengine according to a second embodiment of this invention.

FIG. 6 is a view, similar to FIG. 3, but showing the operation of the control system for a gas turbine aeroengine according to a second embodiment of this invention.

Contrary to the first embodiment where the convergence calculation is used, in the second embodiment, a neuro-function is used in the reasoning to determine the engine inlet condition data.

Explaining the flow chart, the program begins in S100 in which the Mach number Mn is estimated based on the detected atmospheric pressure P0, the detected high-pressure compressor output pressure (inlet pressure to the turbines) P3, the detected rotational speed of the low-pressure turbine N1 and the detected rotational speed of the high-pressure turbine N2, etc, using a neuro function prepared beforehand based on simulation data or engine operation data (flight envelope).

Figure 7:
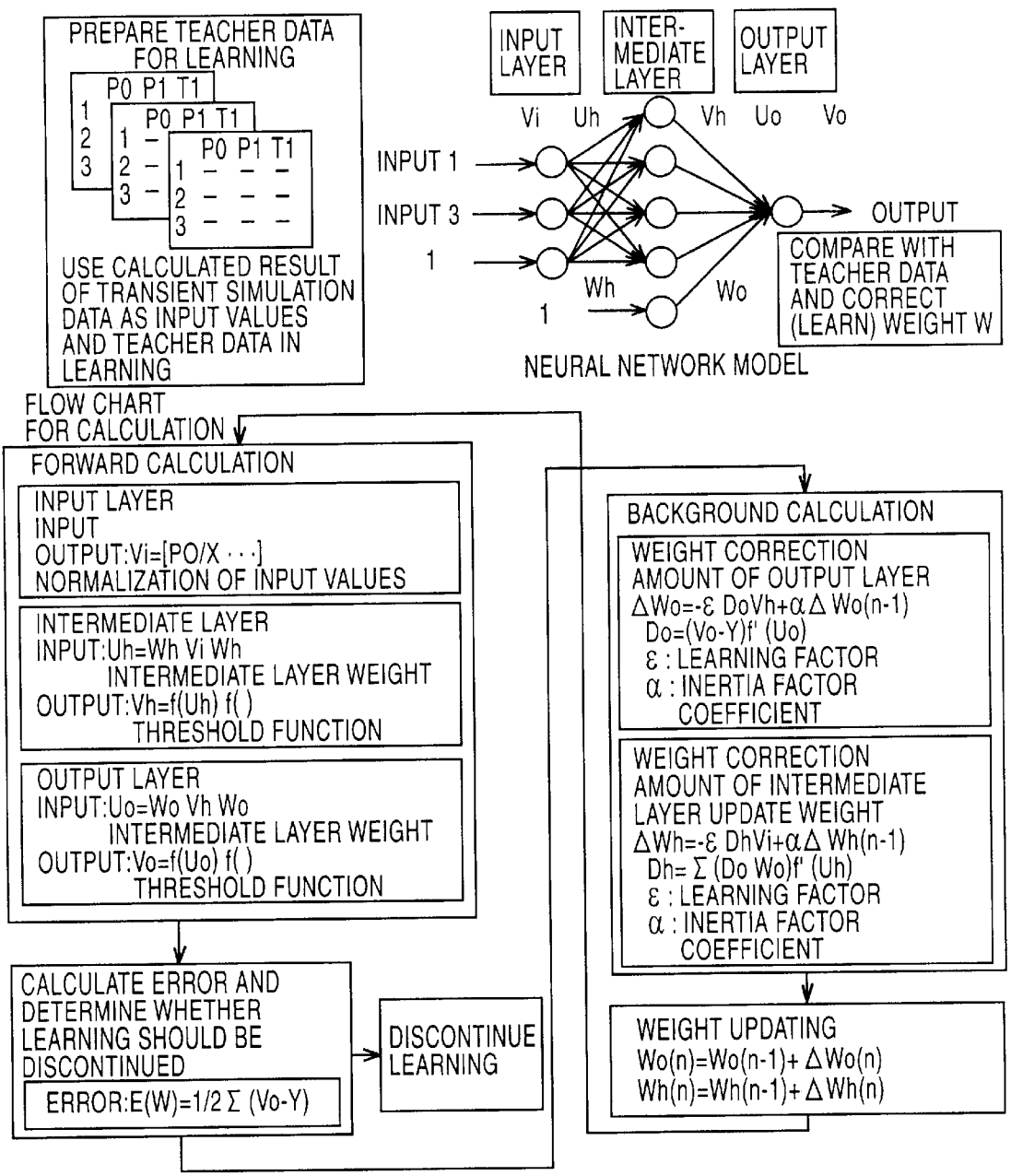
FIG. 7 is a chart explaining the preparation of a neuro-function referred to in the flow chart of FIG. 6.

FIG. 7 is a chart showing the preparation of the neuro-function. The neuro-function should be prepared beforehand through sufficient learning by using simulation data describing transient engine operations or the flight envelope or as input data and teacher data. As illustrated, the network is in a hierarchy of three layers and a sigmoid function is used as the threshold function. The input to the network is standardized or normalized using a scaling matrix. In the bottom of the figure is a flow chart showing the calculation of neuro-function. Here, the learning factor, inertia factor coefficient, neuron number and the threshold function, etc., are used as tuning parameters.

Returning to the flow chart of FIG. 6, the program proceeds to S102 in which the pressure altitude ALT is calculated based on the detected atmospheric pressure P0 using the same function as is used in the first embodiment.

The program then proceeds to S104 in which the intake air pressure P1 is calculated based on the Mach number Mn and the detected atmospheric pressure P0 using the same equation as is used in the first embodiment.

The program then proceeds to S106 in which the intake air temperature T1 is estimated by retrieving mapped data 2 using the calculated intake air pressure P1, the detected high-pressure compressor output pressure (inlet pressure to the turbines) P3 and the detected rotational speed of the high-pressure turbine N2 as address data.

The program then proceeds to S108 in which the static air temperature SAT is calculated based on the estimated intake air temperature T1 and the Mach number Mn using the same equation as is used in the first embodiment.

The program then proceeds to S110 in which the engine inlet condition data determined by the ADC 92 is input from the ADC 92, and proceeds to S112 in which it is determined whether the engine inlet condition data determined by the ECU 80 is (completely or at least substantially) equal to that determined by the ADC 92.

When the result is negative, the program proceeds to S114 in which it is determined that an abnormality arises in the system of ADC 92 or its communication system, and if desired, the result is informed to the operator (pilot) by, for example, using the display 96 located in the cockpit. When the result is affirmative, since this indicates the system of ADC 92 including its communication system operates normally, the program is terminated.

Having been configured in the foregoing manner, the control system for a gas turbine aeroengine according to the second embodiment makes it possible to determine the necessary engine inlet condition data, without using the engine inlet sensors including the temperature sensor 68 and the pressure sensor 70, based on the outputs from the sensors (other than the engine inlet sensors) through reasoning or logic.

Further, different from those disclosed in U.S. Pat. No. 4,249,238, since no engine model or real-time basis model updating of the same is needed, the control system according to the second embodiment is relatively simple in configuration.

Furthermore, the control system according to the second embodiment can also detect an abnormality arising in the system of ADC 92 or its communication system and can inform the result to the operator (pilot).

Similar to the first embodiment, the procedures mentioned in S110 and on are not indispensable.

It should be noted in the second embodiment that, although the neuro-function is used in the second embodiment, any other approximate function can instead be used.

The first and second embodiments, in particular the first embodiment, are thus configured to have a system for controlling a gas turbine aeroengine (10) having at least a turbine (40 or 42) which is rotated by gas produced by the engine to rotate a rotor (12a or 24a) that sucks in air, having: turbine rotational speed detecting means (62, 64) for detecting a rotational speed of the turbine (N1 or N2); turbine inlet pressure detecting means (74) for detecting an inlet pressure of the turbine (P3); and atmospheric pressure detecting means (72) for detecting an atmospheric pressure (P0) exerting on the engine. The system includes engine inlet condition data estimating means (ECU 80, S10 to S22, S100 to S108) for estimating engine inlet condition data (Mn, ALT, TAT, SAT) based at least on the detected rotational speed of the turbine, the detected inlet pressure of the turbine and the detected atmospheric pressure.

In the system, the system is connected to an on-board computer (92) installed in an airframe on which the engine is mounted and includes; data inputting means (ECU 80, S24, S110) for inputting engine inlet condition data determined by the on-board computer; data comparing means (ECU 80, S26, S112) for comparing the input engine inlet condition data determined by the on-board computer with the engine inlet condition data estimated by the engine inlet condition data estimating means and for determining whether the input engine inlet condition data determined by the on-board computer is equal to the engine inlet condition data estimated by the engine inlet condition data estimating means; and determining means (ECU 80, S28, S114) for determining that an abnormality arises in the on-board computer when the input engine inlet condition data determined by the on-board computer is not equal to the engine inlet condition data estimated by the engine inlet condition data estimating means.

The system further includes; informing means (ECU 80, S28, S114) for informing an operator when it is determined that an abnormality arises in the on-board computer.

In the system, the engine inlet condition data estimating means includes: first data setting means (ECU 80, S12) for provisionally setting a first data (T1) of the engine inlet condition data to a value; second data estimating means (ECU 80, S14, S16) for estimating a second data (P1) of the engine inlet condition data based at least on the provisionally set value of the first data (T1); and a detected data (N1 or N2) other than the engine inlet condition data, more precisely a data (Mn) based on the provisionally set value (T1) and the detected data (N1, N2) and the second data (P1) based on the estimated value (Mn) and a detected value (P0); first data estimating means (ECU 80, S118) for estimating the first data (T1) based at least on the estimated second data (P1) and the detected data (N2, more precisely); and determining means (ECU 80, S20) for determining whether the provisionally set value of the first data (T1) is equal to the estimated first data (T1); and wherein the first data setting means (ECU 80, S12) continues to provisionally set the first data to a value until the provisionally set value of the first data is equal to the estimated first data.

In the system, the engine inlet condition data estimating means includes: first data calculating means (ECU 80, S100 to S104) for calculating a first data (P1) of the engine inlet condition data based on a detected data (P0) other than the engine inlet condition data using a neuro-function, more precisely a value (Mn) and the first data (P1) based on the value (Mn) and based on the detected data (P0); and second data estimating means (ECU 80, S102 to S108) for estimating a second data (T1) of the engine inlet condition data based at least on the calculated first data (P1).

It should be noted in the above that, although the foregoing embodiments are explained with regard to a turbofan engine as an example of a gas turbine aeroengine, the gas turbine aeroengine can instead be a turbojet engine, a turboprop engine, a turboshaft engine or the like.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a gas turbine aeroengine having at least a turbine which is rotated by gas produced by the engine to rotate a rotor that sucks in air, comprising;

turbine rotational speed detecting means for detecting a rotational speed of the turbine;

turbine inlet pressure detecting means for detecting an inlet pressure of the turbine;

atmospheric pressure detecting means for detecting an atmospheric pressure exerting on the engine; and engine inlet condition data estimating means for estimating engine inlet condition data including at least a Mach number and a pressure altitude based at least on the detected rotational speed of the turbine, the detected inlet pressure of the turbine and the detected atmospheric pressure.

2. A system according to claim 1, wherein the system is connected to an on-board computer installed in an airframe on which the engine is mounted and includes;

data inputting means for inputting engine inlet condition data determined by the on-board computer;

data comparing means for comparing the input engine inlet condition data determined by the on-board computer with the engine inlet condition data estimated by the engine inlet condition data estimating means and for determining whether the input engine inlet condition data determined by the on-board computer is equal to the engine inlet condition data estimated by the engine inlet condition data estimating means; and determining, means for determining that an abnormality arises in the on-board computer when the input engine inlet condition data determined by the on-board computer is not equal to the engine inlet condition data estimated by the engine inlet condition data estimating means.

3. A system according to claim 2, further including;

informing means for informing an operator when it is determined that an abnormality arises in the on-board computer.

4. A system according to claim 1, wherein the engine inlet condition data estimating means includes:

first data setting means for provisionally setting a first data of the engine inlet condition data to a value;

second data estimating means for estimating a second data of the engine inlet condition data based at least on the provisionally set value of the first data and a detected data other than the engine inlet condition data;

first data estimating means for estimating the first data based at least on the estimated second data and the detected data; and determining means for determining whether the provisionally set value of the first data is equal to the estimated first data;

and wherein the first data setting means continues to provisionally set the first data to a value until the provisionally set value of the first data is equal to the estimated first data.

5. A system according to claim 1, wherein the engine inlet condition data estimating means includes:

first data calculating means for calculating a first data of the engine inlet condition data based on a detected data other than the engine inlet condition data using a neuro-function; and second data estimating means for estimating remaining data of the engine inlet condition data based at least on the calculated first data.

6. A method of controlling a gas turbine aeroengine having at least a turbine which is rotated by gas produced by the engine to rotate a rotor that sucks in air, comprising the steps of:

detecting a rotational speed of the turbine;

detecting an inlet pressure of the turbine;

detecting an atmospheric pressure exerting on the engine; and estimating engine inlet condition data including at least a Mach number and a pressure altitude based at least on the detected rotational speed of the turbine, the detected inlet pressure of the turbine and the detected atmospheric pressure.

7. A method according to claim 6, further including the steps of;

inputting engine inlet condition data determined by an on-board computer installed in an airframe on which the engine is mounted;

comparing the input engine inlet condition data determined by the on-board computer with the engine inlet condition data estimated by the step of engine inlet condition data estimation and for determining whether the input engine inlet condition data determined by the on-board computer is equal to the engine inlet condition data estimated by the step of engine inlet condition data estimation; and determining that an abnormality arises in the on-board computer when the input engine inlet condition data determined by the on-board computer is not equal to the engine inlet condition data estimated by the step of engine inlet condition data estimation.

8. A method according to claim 7, further including the step of;

informing an operator when it is determined that an abnormality arises in the onboard computer.

9. A method according to claim 6, wherein the step of engine inlet condition data estimation includes the steps of:

provisionally setting a first data of the engine inlet condition data to a value;

estimating a second data of the engine inlet condition data based at least on the provisionally set value of the first data and a detected data other than the engine inlet condition data;

estimating the first data based at least on the estimated second data and the detected data; and determining whether the provisionally set value of the first data is equal to the estimated first data;

and wherein the step of first data setting continues to provisionally set the first data to a value until the provisionally set value of the first data is equal to the estimated first data.

10. A method according to claim 6, wherein the step of engine inlet condition data estimation includes the steps of:

calculating a first data of the engine inlet condition data based on a detected data other than the engine inlet condition data using a neuro-function; and estimating remaining data of the engine inlet condition data based at least on the calculated first data.

11. A computer program embodied on a computer-readable medium for controlling a gas turbine aeroengine having at least a turbine which is rotated by gas produced by the engine to rotate a rotor that sucks in air, comprising the steps of:

detecting a rotational speed of the turbine;

detecting an inlet pressure of the turbine;

detecting an atmospheric pressure exerting on the engine; and estimating engine inlet condition data including at least a Mach number and a pressure altitude based at least on the detected rotational speed of the turbine, the detected inlet pressure of the turbine and the detected atmospheric pressure.

* * * * *